United States Patent
Jang et al.

(10) Patent No.: US 9,352,664 B2
(45) Date of Patent: May 31, 2016

(54) CHARGING CONTROL METHOD AND SYSTEM FOR ENVIRONMENTALLY FRIENDLY VEHICLE

(71) Applicant: Hyundai Motor Company, Seoul (KR)

(72) Inventors: Hui Sung Jang, Gyeonggi-do (KR);
Shin Hye Chun, Jeollanam-do (KR);
Mu Shin Kwak, Gyeonggi-do (KR);
Hyun Wook Seong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 207 days.

(21) Appl. No.: 14/099,353

(22) Filed: Dec. 6, 2013

(65) Prior Publication Data
US 2015/0054469 A1    Feb. 26, 2015

(30) Foreign Application Priority Data
Aug. 26, 2013   (KR) .......................... 10-2013-0100845

(51) Int. Cl.
*H02J 7/04*   (2006.01)
*H02J 7/16*   (2006.01)
*B60L 11/18*  (2006.01)

(52) U.S. Cl.
CPC ......... *B60L 11/1861* (2013.01); *B60L 11/1816* (2013.01); *B60L 2210/10* (2013.01); *B60L 2210/30* (2013.01); *B60L 2240/547* (2013.01); *B60L 2240/549* (2013.01); *B60L 2240/80* (2013.01); *Y02T 10/705* (2013.01); *Y02T 10/7005* (2013.01); *Y02T 10/7044* (2013.01); *Y02T 10/7072* (2013.01); *Y02T 10/7216* (2013.01); *Y02T 10/7241* (2013.01); *Y02T 90/127* (2013.01); *Y02T 90/14* (2013.01)

(58) Field of Classification Search
CPC ....... H02J 7/008; H02J 7/0072; H02J 7/0031; H02J 7/0068; H02J 7/022

USPC ......................................................... 320/162
See application file for complete search history.

(56) References Cited

U.S. PATENT DOCUMENTS

| | | | | |
|---|---|---|---|---|
| 8,829,858 B2* | 9/2014 | Ransom | ................ | H02M 7/219 320/127 |
| 2006/0114702 A1* | 6/2006 | Yamada | .................. | H02M 1/38 363/132 |
| 2006/0197346 A1* | 9/2006 | Maehara | ................. | F02D 29/02 290/40 B |
| 2010/0213859 A1* | 8/2010 | Shteynberg | ......... | H05B 33/0815 315/224 |
| 2012/0201061 A1* | 8/2012 | Hampo | ............... | H02M 1/4225 363/74 |
| 2012/0313572 A1* | 12/2012 | Sheu | ..................... | H02J 7/0072 320/107 |

FOREIGN PATENT DOCUMENTS

| | | |
|---|---|---|
| JP | 2013-034307 A | 2/2013 |
| JP | 2013034349 A | 2/2013 |
| JP | 2013-085442 A | 5/2013 |
| KR | 10-0221797 | 6/1999 |
| KR | 10-2011-0094634 | 8/2011 |
| KR | 10-2012-0067068 A | 6/2012 |
| KR | 10-2012-0102308 | 9/2012 |
| KR | 10-1286509 B1 | 7/2013 |

* cited by examiner

*Primary Examiner* — Arun Williams
(74) *Attorney, Agent, or Firm* — Mintz Levin Cohn Ferris Glovsky and Popeo, P.C.; Peter F. Corless

(57) ABSTRACT

A charging control method and system for an environmentally friendly vehicle are provided and promote the enhancement of charging efficiency by improving a power control method of a power factor correction (PFC) converter while a battery is being charged through an on board charger (OBC) in vehicle. The method sensing, by a voltage detector, a battery voltage during charging and calculating, by a controller, a target value to maintain an output voltage of the PFC converter. The target value is calculated from the sensed battery voltage and the maximum available duty value of the DC-DC converter. The output voltage of the PFC converter is maintained, based on the calculated target value.

15 Claims, 17 Drawing Sheets

CHARGING CONTROL METHOD AND SYSTEM FOR ENVIRONMENTALLY FRIENDLY VEHICLE

CROSS-REFERENCE TO RELATED APPLICATION

This application claims under 35 U.S.C. §119(a) the benefit of Korean Patent Application No. 10-2013-0100845 filed Aug. 26, 2013, the entire contents of which are incorporated herein by reference.

BACKGROUND (a) Technical Field

The present invention relates to a charging control method and system for an environmentally friendly vehicle. More particularly, the present invention relates to a charging control method and system that enhances charging efficiency by improving a power control method of a power factor correction (ITC) converter while a battery is being charged through an on board charger (OBC) in a plug-in hybrid electric vehicle (HEV) or an electric vehicle (EV).

(b) Background Art

As known in the art, a green vehicle (e.g., an environmentally friendly vehicle) such as a plug-in hybrid electric vehicle (HEV) or an electric vehicle (EV) uses an alternating current (AC) electric vehicle supply equipment (EVSE) in connection with a distribution system to charge a battery thereof. In addition, an on board charger (OBC) is built in the plug-in HEV or EV to charge the battery by connecting the vehicle to the AC EVSE.

FIG. 1 is an exemplary diagram illustrating main components of an OBC built in a vehicle 200 according to the related art. As shown in FIG. 1, the OBC includes a power factor correction (PFC) converter 210 that converts an AC input voltage Vac of an AC power source 100 into a direct current (DC) voltage Vdc and simultaneously compensates for the power factor of the voltage, and a DC-DC converter 220 connected between the PFC converter 210 and a high-voltage battery 230 to convert the DC voltage output from the PFC converter 210. In the example shown in FIG. 1, the PFC converter 210 is operated as a boost converter to convert the AC input voltage Vac applied from the AC power source 100 into the DC voltage Vdc at the outside of the vehicle 200. The DC-DC converter 220 may be an insulated DC-DC converter that employs a full-bridge (FB) or half-bridge (HB) switching circuit.

Meanwhile, as the concept of charging energy is introduced to the fuel consumption rate (e.g., miles per gallon equivalent (MPGe)), i.e., the power ratio of the plug-in HEY or EV, the importance for power transmission efficiency of the OBC built in the vehicle is increased.

In the plug-in HEY or EV, the high-voltage battery 230 as a power source for driving the vehicle is operated in a wide voltage range based on the charging/discharging amount thereof, and it is an important subject to achieve high efficiency in the entire voltage range. In addition, the voltage of the battery 230 connected to an output stage of the DC-DC converter 220 of the OBC is determined based on a charging state, and the variation of the voltage of the battery 230 is substantial when the battery 230 is charged. Conventionally, it was difficult to achieve high efficiency in the entire voltage range. In the related art, a method has been developed of controlling the output voltage Vdc of the PFC converter 210 to be a fixed voltage in the OBC shown in FIG. 1.

FIGS. 2a and 2c are exemplary diagrams illustrating a charging control method of the battery in the vehicle through the OBC. FIG. 2(a) illustrates a state of the output voltage Vdc of the PFC converter during the charging of the battery in the related art. FIG. 2(b) illustrates an effective duty Deff for controlling the output voltage of the DC-DC converter during the charging of the battery. FIG. 2(c) illustrates a state of the battery voltage Vbat during the charging of the battery.

As shown in FIG. 2, in the related art charging control method, the output voltage Vdc of the PFC converter is controlled to be constantly fixed. In particular, the variation in the battery voltage is substantial, and therefore, high efficiency may not be achieved in the entire voltage range. The average charging efficiency of the OBC is lowered in a wide operation range of the battery voltage. As a result, the MPGe of the vehicle may deteriorate and the charging time of the vehicle may increase, due to the lowering of the average charging efficiency.

SUMMARY

The present invention provides a charging control method and system that enhances charging efficiency by improving a power control method of a power factor correction (PFC) converter while a battery is being charged through an on board charger (OBC) in a plug-in hybrid electric vehicle (HEV) or electric vehicle (EV).

In one aspect, the present invention provides a charging control method for a plug-in HEV or EV with a built-in OBC including a PFC converter connected to an AC power source to convert an AC input voltage into a DC voltage and compensate for the power factor of the voltage, and a DC-DC converter that converts the DC voltage output from the PFC converter, the charging control method may include: sensing, by a voltage detector, a battery voltage during charging; calculating, by a controller, a target value to maintain an output voltage of the PFC converter from the sensed battery voltage and the maximum available duty value of the DC-DC converter; and maintaining, by the controller, the output voltage of the PFC converter, based on the calculated target value.

In an exemplary embodiment, the charging control method may further include further sensing an AC input voltage during the charging to compare the calculated target value with the sensed AC input voltage. When the calculated target value is a value greater than the sensed AC input voltage, the output voltage of the PFC converter may be maintained, based on the target value. In addition, when the calculated target value is equal to or less than the sensed AC input voltage, the output voltage of the PFC converter may be maintained as a value greater than the AC input voltage.

In another exemplary embodiment, when the calculated target value is equal to or less than the sensed AC input voltage, the output voltage (Vdc) of the PFC converter may be maintained to become the value obtained by adding a predetermined margin value ($\alpha$) to the maximum value (Vac_max) of the sensed AC input voltage. Further, the target value may be calculated from the following equation, using the battery voltage and the maximum available duty value of the DC-DC converter:

$$Vdc\_target = K \times Vbat. \quad \text{Equation:}$$

Here, Vdc_target represents the target value, $K = n/Deff\_max$, Deff_max represents the maximum available duty value of the DC-DC converter, and n represents the number of coil turns of a transformer in the DC-DC converter.

The output voltage of the DC-DC converter may be maintained as the maximum available duty while the output voltage of the PFC converter is being maintained, based on the calculated target value.

According to the charging control method of the present invention, the output voltage of the PFC converter may be variably controlled, in real time, based on the AC input voltage and the battery voltage, thus achieving an improved efficiency in the entire voltage area. Further, since the charging of a battery may be possible through the high-efficiency operation of the OBC in substantially the entire range of the battery charging voltage, it may be possible to enhance charging efficiency, to decrease charging time and to improve MPGe.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
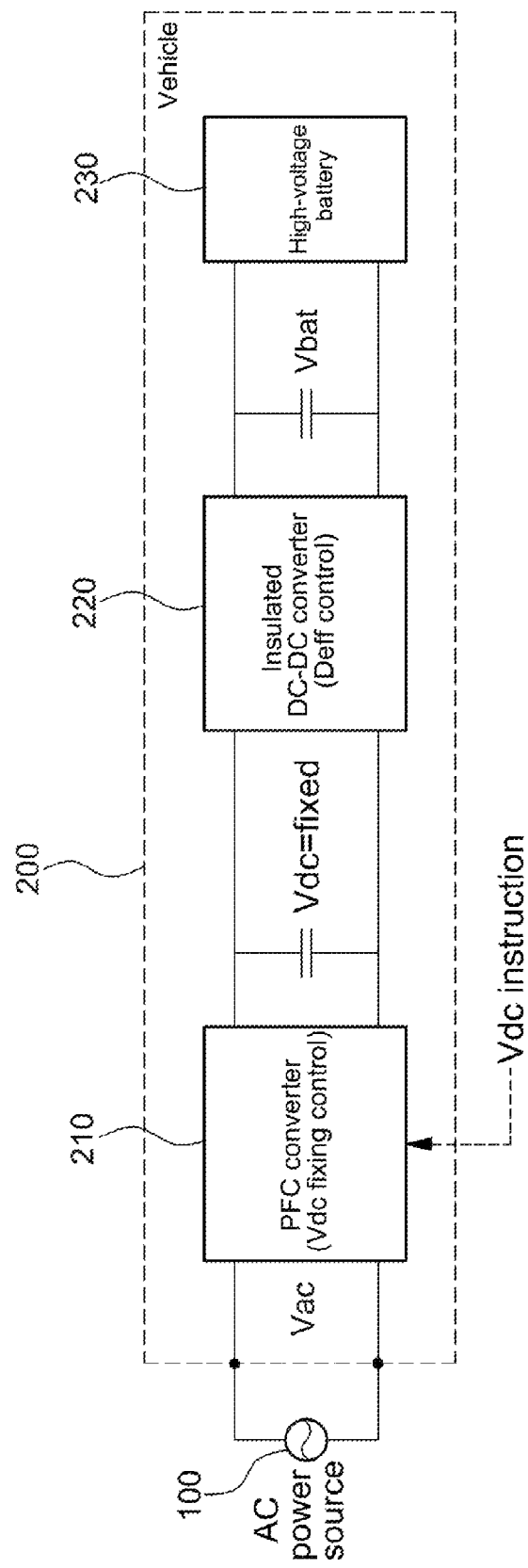
FIG. 1 is an exemplary diagram schematically illustrating main components of an on board charger (OBC) according to the related art.
Figure 2A:
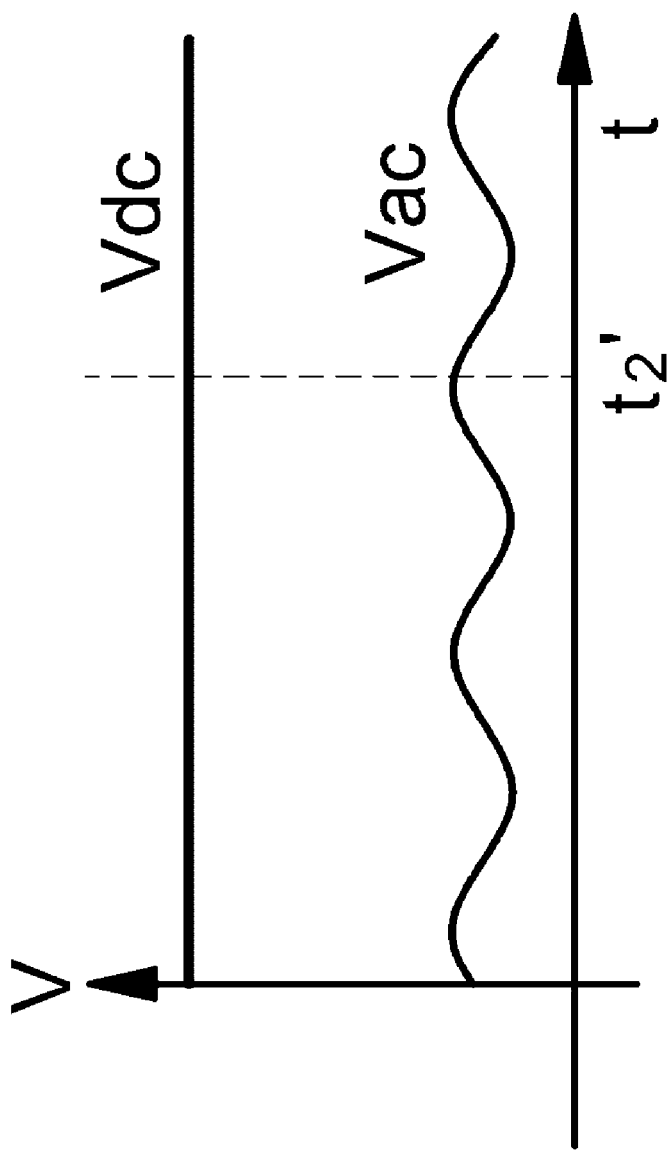
FIGS. 2a-2c is an exemplary diagram illustrating a charging control method according to the related art.
Figure 2B:
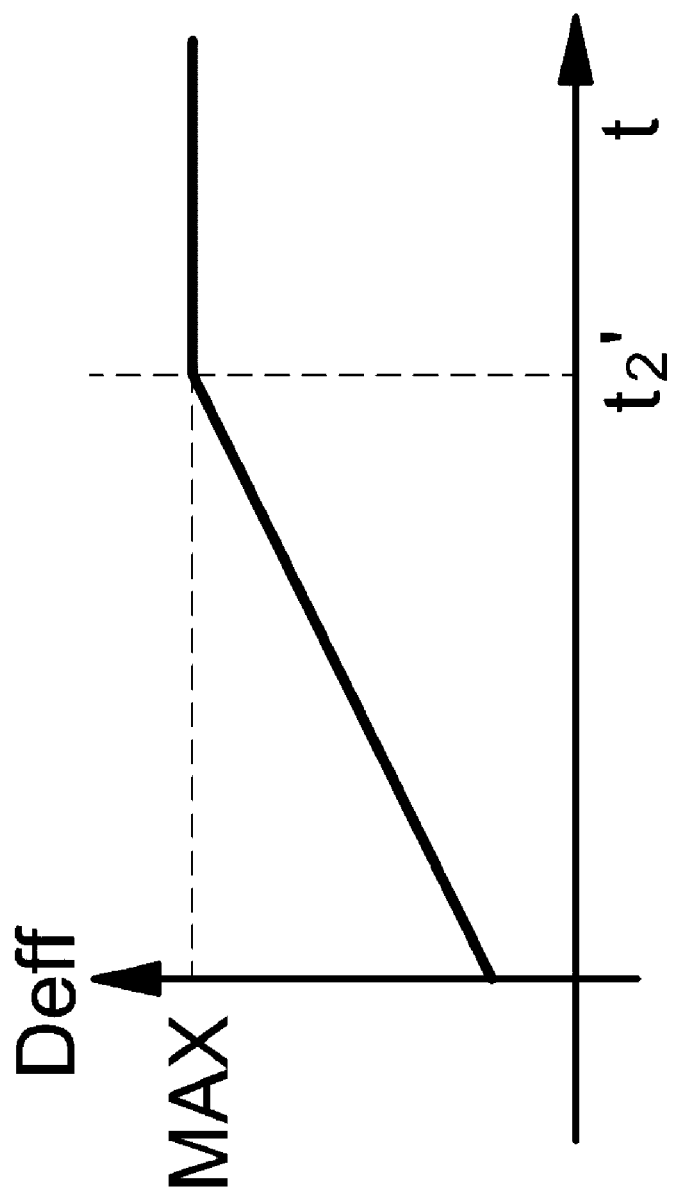
Figure 2C:
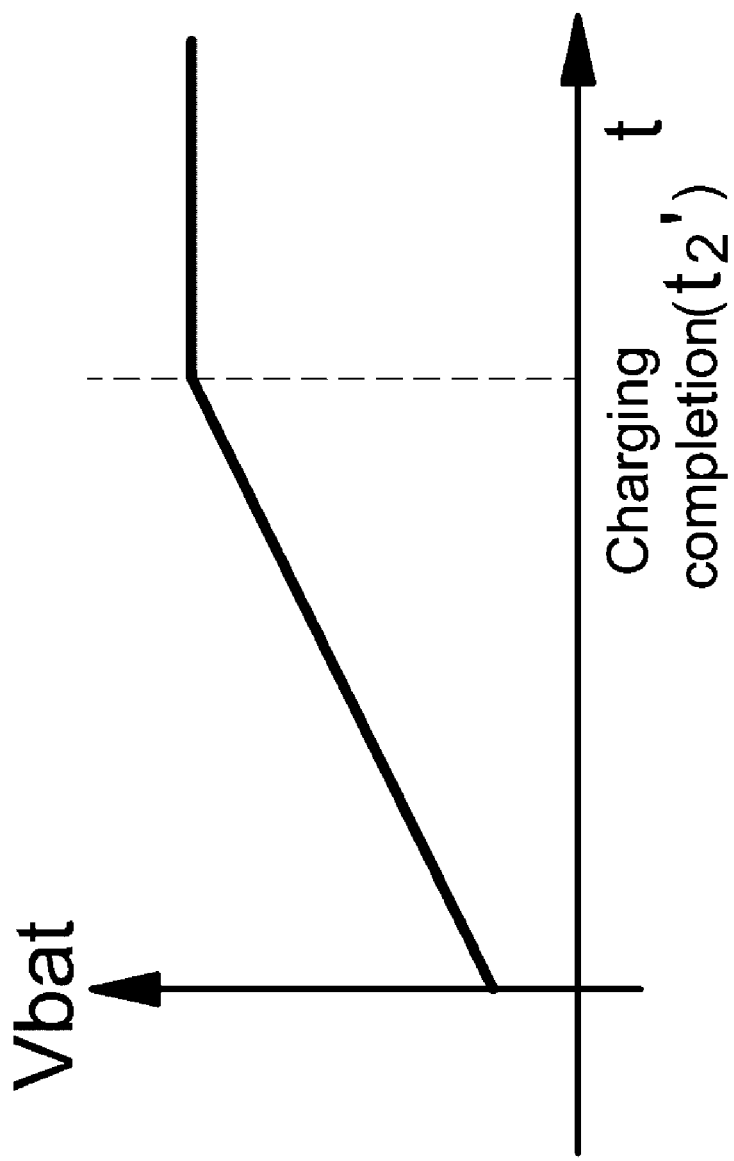
Figure 3:
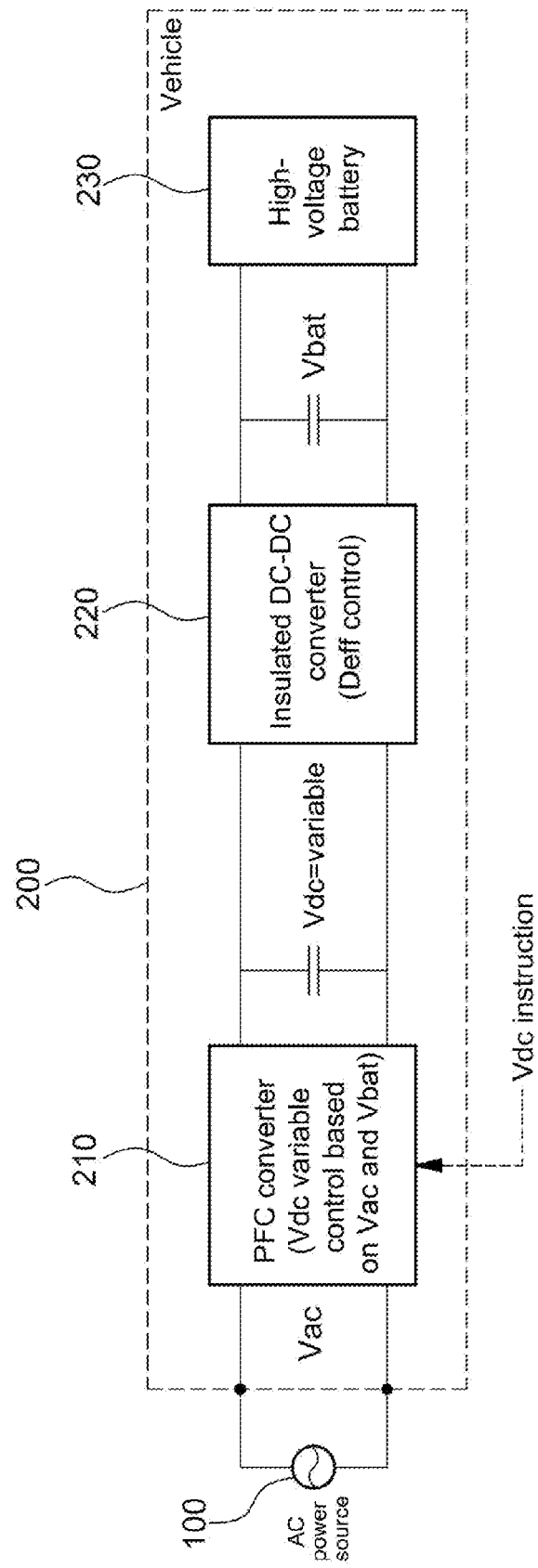
FIGS. 3 and 4a-4c are exemplary diagrams illustrating a charging control method according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and op data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a charging control method and system for a plug-in hybrid electric vehicle (HEV) or electric vehicle (EV), in which a high-voltage battery may be charged using an on board charger (OBC) mounted within the vehicle, which may include a power factor correction (PFC) converter and a DC-DC converter, by connecting the vehicle to an AC electric vehicle supply equipment (EVSE). Particularly, the present invention provides an improved power control method for the PFC converter of the OBC. The present invention provides a charging control method which may enhance charging efficiency by improving the related art method of controlling the output voltage of the PFC converter to be a fixed voltage in a battery charging process.

In the present invention, the output voltage of the PFC converter may be variably controlled in real time, based on input and output voltages of the OBC, which may be sensed during battery charging, for the purpose of high-efficiency charging. In addition, the link voltage at an output stage of the PFC converter may be variably controlled based on an optimum operating point, and thus it may be possible to promote not only the enhancement of charging efficiency but also the decrease in charging time and the improvement of the fuel consumption rate (e.g., miles per gallon equivalent (MPGe)).

Figure 7:
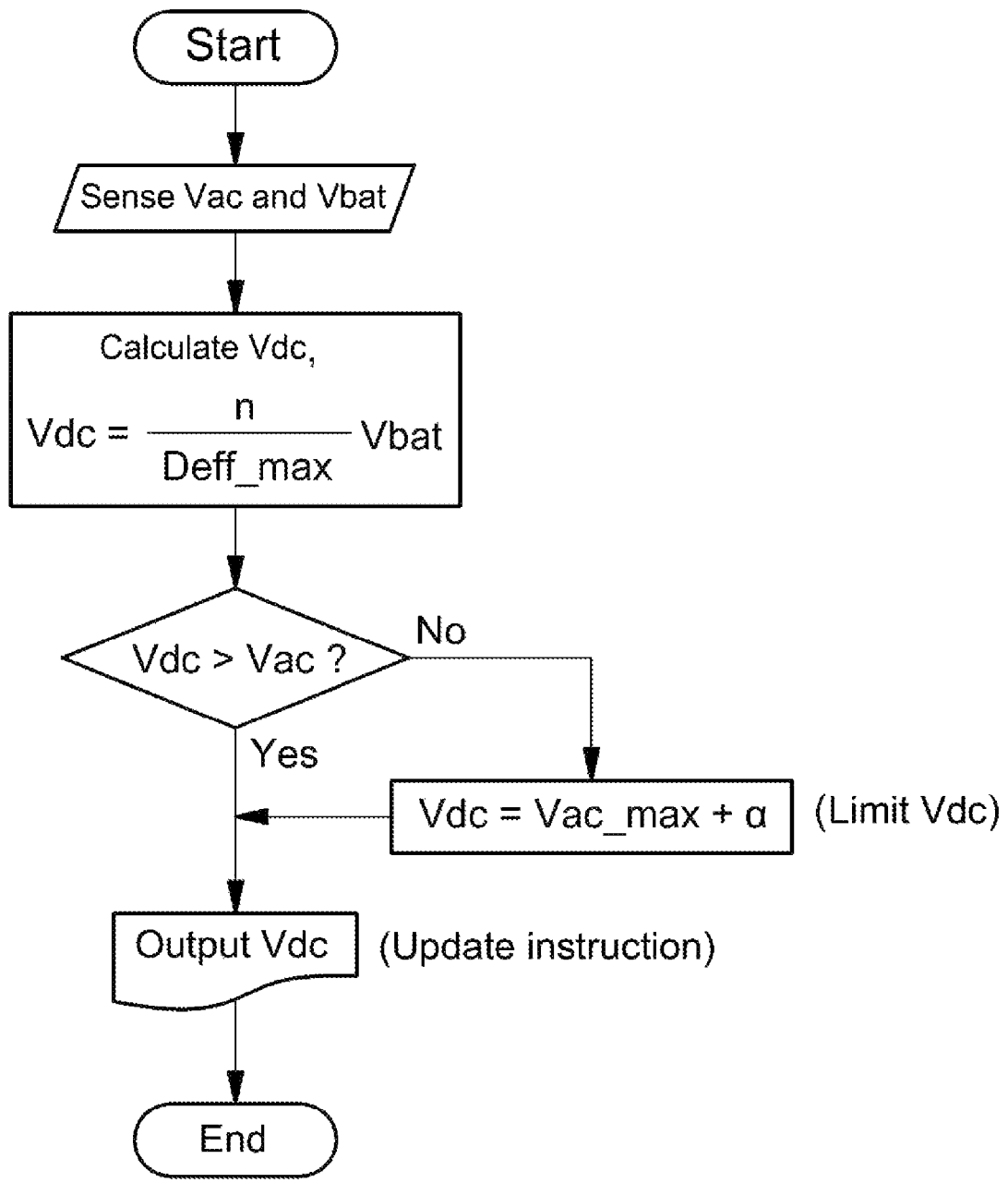
FIG. 7 is an exemplary flowchart illustrating a charging control process according to the exemplary embodiment of the present invention.

Hereinafter, an exemplary embodiment of the present invention will be described with reference to the accompanying drawings. FIGS. 3 and 4a-4c are exemplary diagrams illustrating a charging control method according to an exemplary embodiment of the present invention. FIG. 7 is an exemplary flowchart illustrating the charging control method according to the exemplary embodiment of the present invention.

In the present invention, a controller (not shown) may be configured to variably maintain (e.g., control), in real time, an output voltage Vdc of a PFC converter 210, i.e., a voltage at a link stage to which a DC-DC converter 220 may be connected, based on input and output voltages of an OBC, which may be sensed using a voltage detector (not shown). In particular, the input voltage of the OBC is an AC input voltage Vac applied from an AC power source 100 extraneous to a vehicle 200 to the PFC converter 210 during battery charging when the vehicle 200 is connected to the AC power source 100, and the output voltage of the OBC is a voltage Vbat of a battery 230 connected to an output stage of the DC-DC converter 220.

In the present invention, the output voltage Vdc of the PFC converter 210 may be controlled as a voltage value (target value Vdc_target) determined using the battery voltage Vbat and the maximum available duty value (Deff_max) of the DC-DC converter 220, for the purpose of high-efficiency charging. However, the output voltage Vdc of the PFC converter 210 may be controlled as the voltage value obtained from the battery voltage and the maximum available duty value when the output voltage Vdc of the PFC converter 210 is greater than the AC input voltage Vac. In particular, when the output voltage Vdc of the PFC converter 210 is less than the AC input voltage Vac, the unit power factor control of the PFC converter mainly operated as a boost converter may not be possible. Therefore, the output voltage of the PFC converter may be necessarily controlled as a voltage value greater than the AC input voltage.

In the OBC to which the present invention is applied, when the DC-DC converter 220 includes a full-bridge (FB) or half-bridge (HB) insulated DC-DC converter, the relationship between the input and output voltages Vdc and Vbat of the DC-DC converter may be represented by the following Equation 1, using the effective duty Doff of the converter and the number n of coil turns of a transformer.

$$Vbat = Vdc \times (Deff/n) \text{ (here, } Deff=0\sim1\text{)} \quad \text{Equation 1}$$

In Equation 1, the output voltage Vdc of the PFC converter, which may be maximally output based on the battery voltage Vbat, may be represented by the following Equation 2.

$$Vdc = Vbat \times (n/Deff) \quad \text{Equation 2:}$$

When the maximum available duty value is used as the effective duty of the PFC converter 210 for the purpose of high-efficiency charging, the output voltage Vdc of the ITC converter may be represented by the following Equation 3, using a constant K and the battery voltage Vbat.

$$Vdc = K \times Vbat (=Vdc\_target) \quad \text{Equation 3:}$$

Here, the constant $K=n/Deff\_max$, and Deff_max is the maximum available duty value of the DC-DC converter.

Vdc_target represents a target value for variably controlling, in real time, the output voltage of the PFC converter (or a Vdc voltage instruction for the PFC converter). In other words, when the output of the PFC converter maintained by the controller, the output voltage of the PFC converter may be variably controlled, in real time, as the target value Vdc_target calculated from Equation 3 based on the battery voltage Vbat. Particularly, when the target value for controlling the output of the PFC converter is calculated, the maximum available duty value Deff_max of the DC-DC converter may be used as shown in Equation 3.

However, when the output voltage Vdc of the PFC converter is less than the AC input voltage Vac, the unit power factor control of the PFC converter operated as a boost converter may not be possible. Therefore, the output voltage Vdc of the ITC converter may be maintained as a voltage greater than the AC input voltage Vac. In particular, the target value Vdc_target for controlling the output voltage of the PFC converter may be determined as shown in Equation 4.

$$\text{When } Vdc \leq Vac, Vdc\_target = Vac\_max + \alpha \quad \text{Equation 4:}$$

Here, Vdc represents a calculation value determined by Equation 3, Vac_max represents the maximum value of the AC input voltage Vac, and α represents a predetermined margin value.

For example, the output voltage of the PFC converter may be maintained as the calculated target value under a condition in which the target value calculated by Equation 3 is greater than the sensed AC input voltage, (i.e., a condition of Vdc (=Vdc_target)>Vac (condition 1)) and a limit value shown in Equation 4 may be provided under a condition of Vdc≤Vac (condition 2). Thus, the output voltage Vdc of the PFC converter may be maintained as the target value (Vdc_target=Vac_max) obtained by adding the margin value to the maximum value Vac_max of the AC input voltage Vac.

Figure 4A:
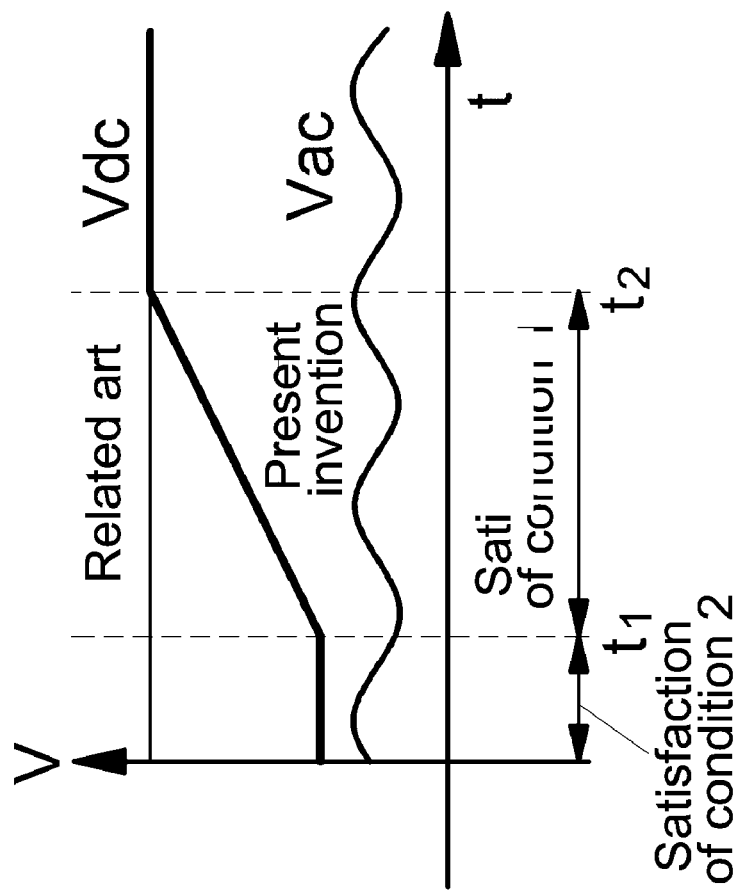
Figure 4B:
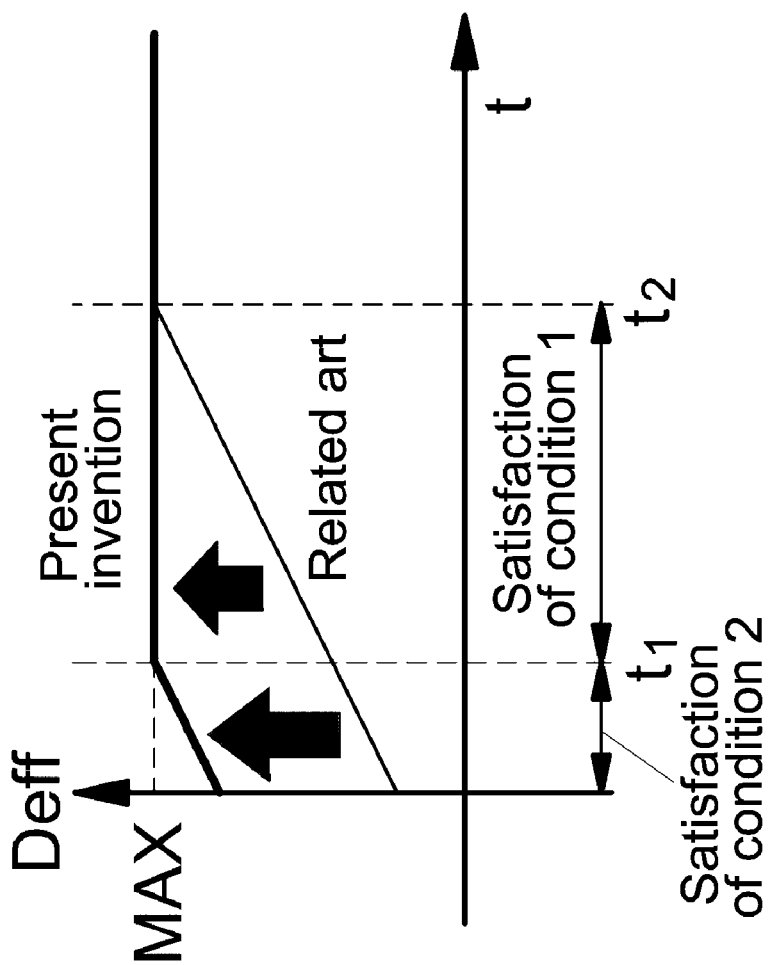
Figure 4C:
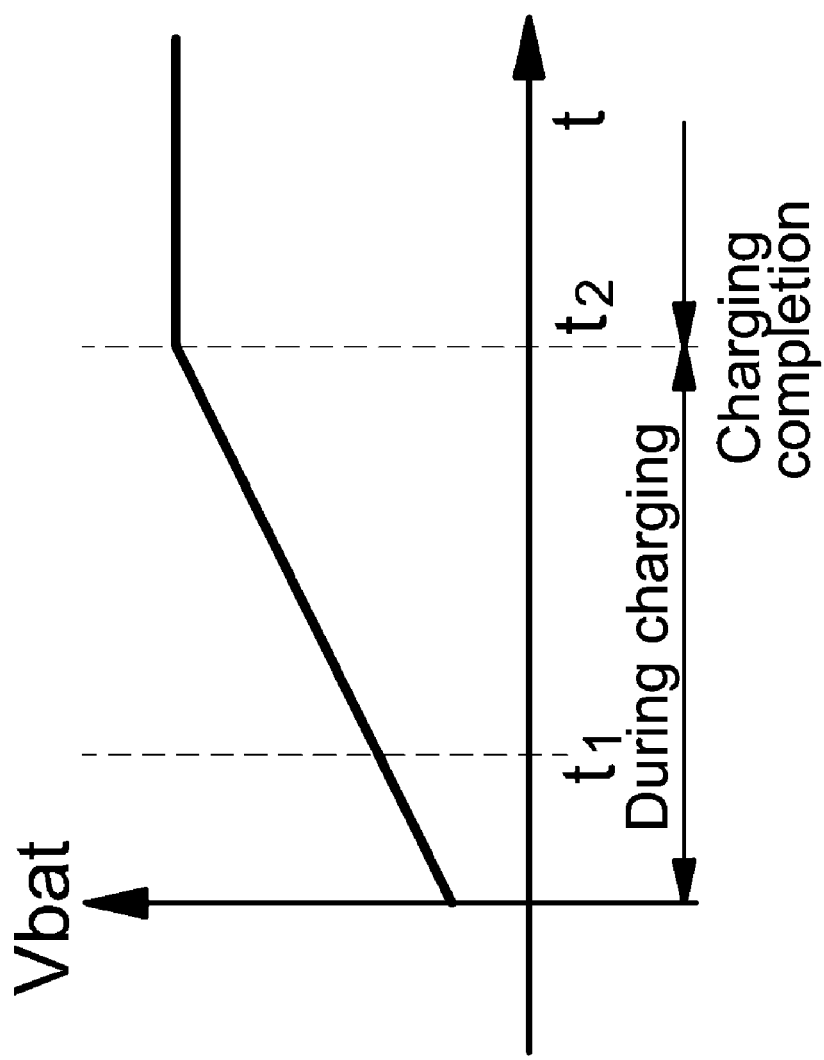

FIG. 4(a) illustrates the output voltage Vdc of the PFC converter, which may be maintained during battery charging, and FIG. 4(b) illustrates the effective duty Deff used in the control of the output voltage of the DC-DC converter during battery charging. FIG. 4(c) illustrates the battery voltage Vbat during battery charging.

Referring to FIG. 4(a), the output voltage of the PFC converter may be constantly maintained as the target value Vdc_target obtained from Equation 4 at a section where the condition 2 (Vdc≤Vac) is satisfied, to maintain the output voltage Vdc of the PFC converter as a value greater than the AC input voltage Vac. Accordingly, it may be possible to avoid the area in which the unit power factor control of the PFC converter is impossible. In addition, the output voltage Vdc of the PFC converter may be variably maintained as the target value calculated by Equation 3, using the sensed battery voltage Vbat and the maximum available duty value Deff_max, at the section where the condition 1 (Vdc>Vac) is satisfied.

Referring to FIG. 4(b), the maximum available duty value Deff_max of the DC-DC converter may be used to determine the output voltage of the PFC converter at the section where the condition 1 (Vdc>Vac) is satisfied.

The flowchart of FIG. 7 illustrates a process of determining a control target value (e.g., voltage instruction) for variably controlling the output voltage Vdc of the PFC converter, based on the AC input voltage Vac and the battery voltage Vbat, which are sensed in the controller.

As shown in FIG. 7, the controller may be configured to sense an AC input voltage Vac of the PFC converter and a battery voltage Vbat, and calculate a target value for maintaining the output voltage of the PFC converter, using the sensed battery voltage Vbat and the maximum available duty value Deff_max. Subsequently, the output voltage Vdc of the PFC converter (210 of FIG. 3), i.e., the voltage at the link stage to which the DC-DC converter (220 of FIG. 3) is connected, may be variably maintained, in real time, based on the calculated target value.

Further, the variable control of the output voltage of the PFC converter may be performed when the calculated target value is greater than the sensed AC input voltage Vac, (i.e., when Vdc(=Vdc_target)>Vac). The variable control of the output voltage of the PFC converter may mean that the target value Vdc_target calculated using the battery voltage Vbat and the maximum available duty value Deff_max may be confirmed as a voltage instruction, and the output voltage of the PFC converter may be maintained based on the confirmed voltage instruction. In particular, the output voltage of the DC-DC converter 220 connected between the PFC converter 210 and the battery 230 may be maintained using the maximum available duty value Deff_max as the effective duty Deff.

Meanwhile, when the output voltage Vdc of the PFC converter is less than the AC input voltage Vac, the unit power factor control of the PFC converter may not be possible. Therefore, the output voltage of the PFC converter may be maintained greater than the AC input voltage. Thus, when the calculated target value is less than the AC input voltage Vac, (i.e., when Vdc(=Vdc_target)≤Vac), the output voltage of the PFC converter may be maintained by determining, as the target value, the value obtained by adding a margin value a to the maximum value (Vac_max) of the AC input voltage (Vdc_target=Vac_max+α).

As described above, the control of the PFC converter which limits the output voltage based on the input voltage may be performed to limit and maintain the output voltage of the PFC converter as a lower limit value or greater based on the input value.

FIGS. 5a-6c are exemplary diagrams illustrating that the output voltage of the PFC converter is limited for the purpose of unit power factor control according to the exemplary embodiment of the present invention.

Figure 5A:
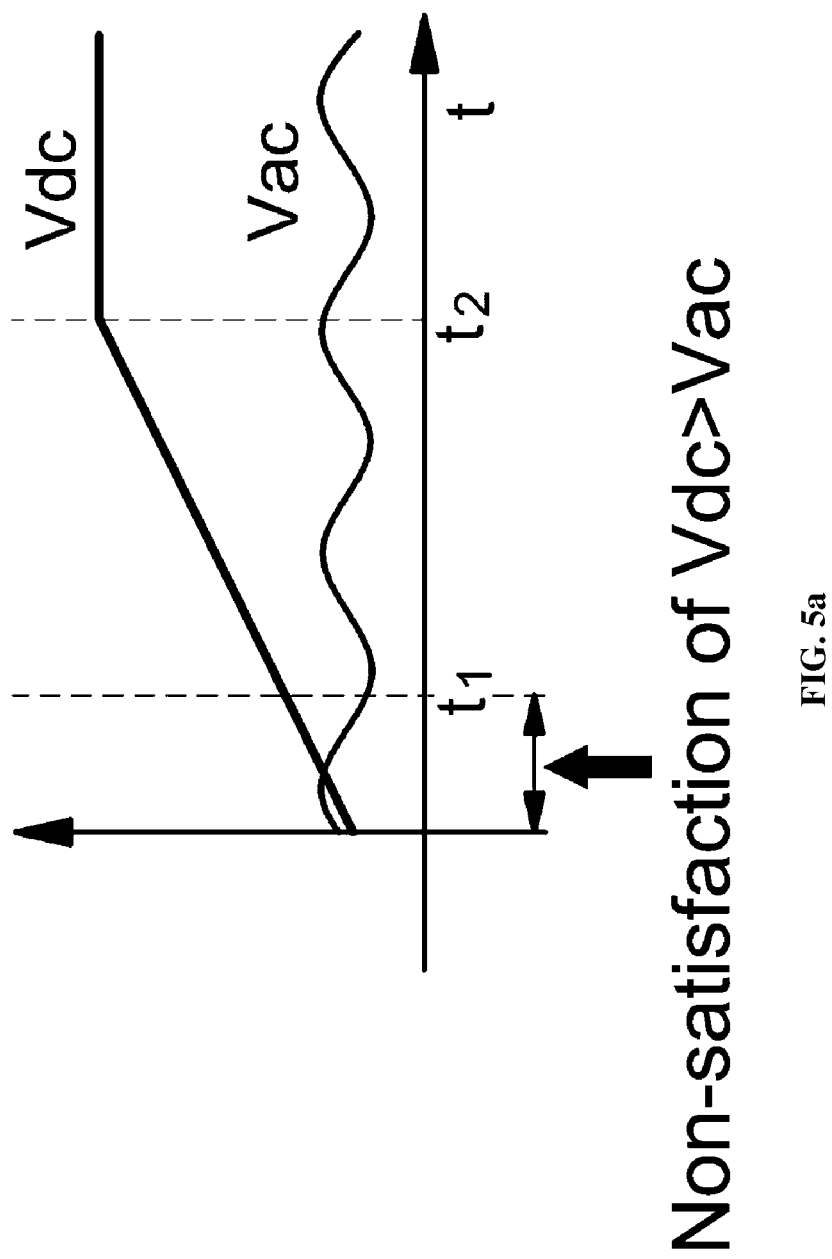
FIGS. 5a-5c and 6a-6c are exemplary diagrams illustrating that the output voltage of a power factor correction (PFC) converter is limited for unit power factor control according to the exemplary embodiment of the present invention.
Figure 5B:
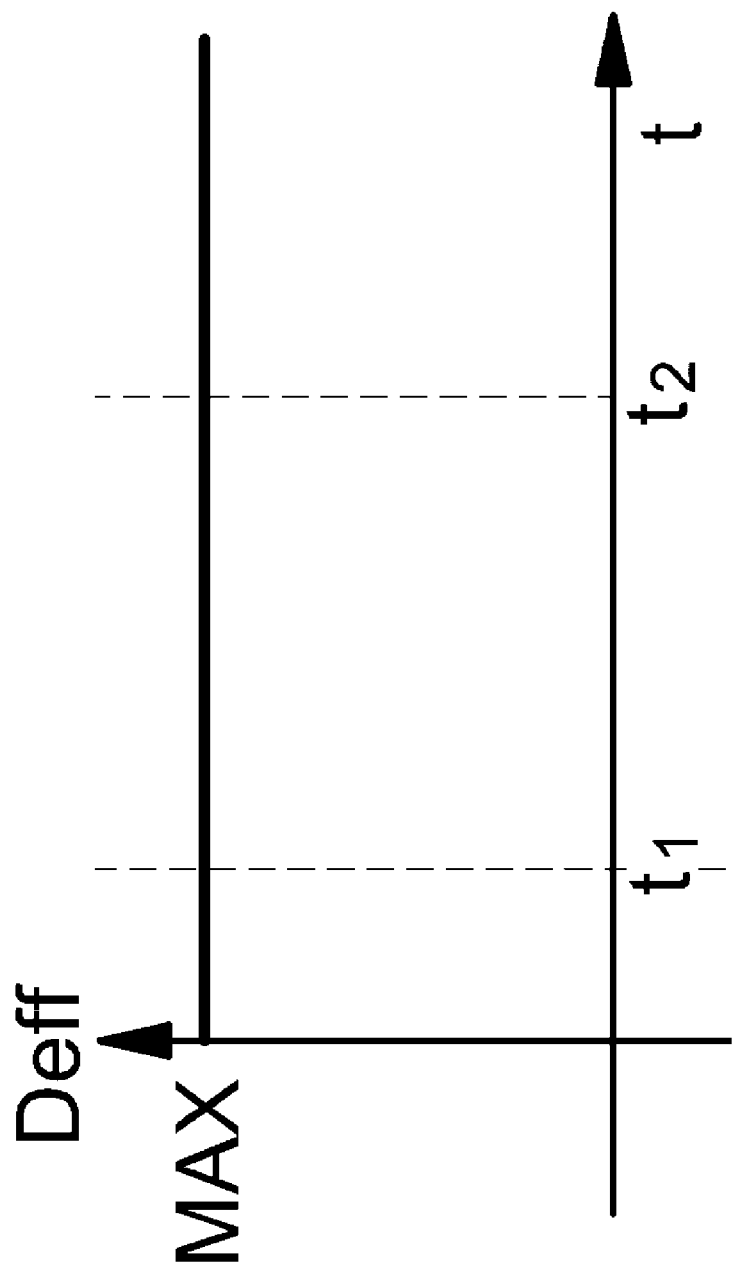
Figure 5C:
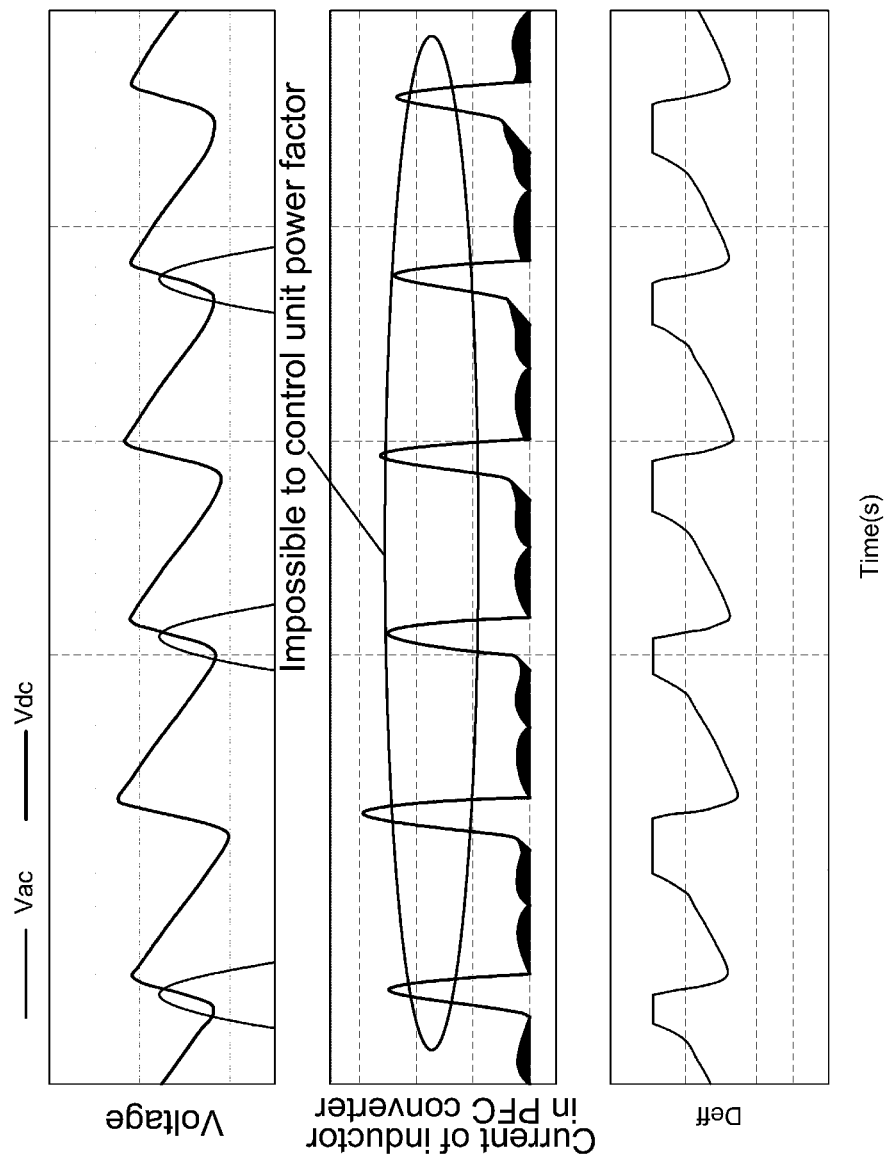
Figure 6A:
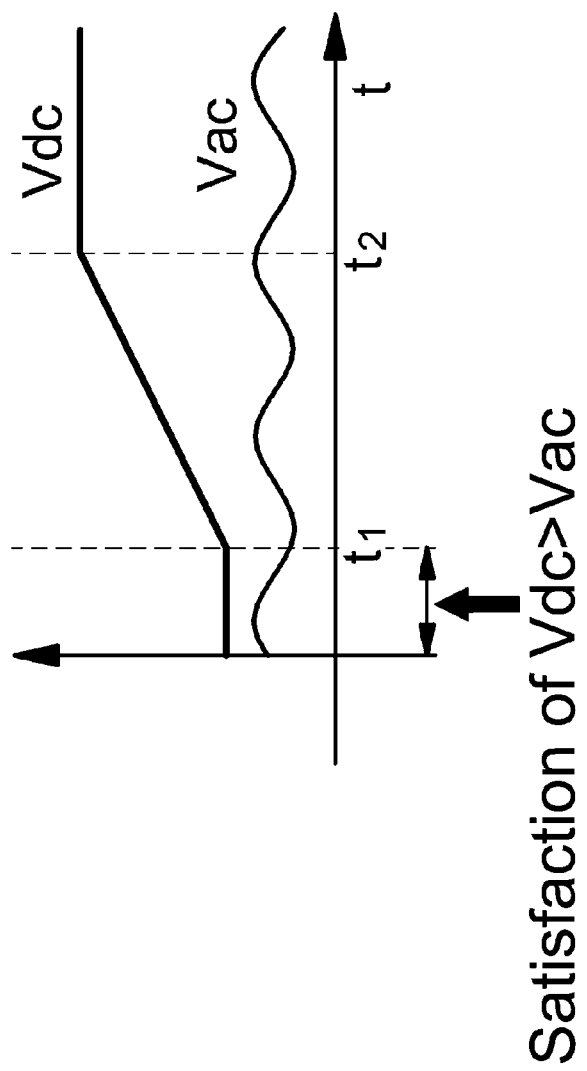
Figure 6B:
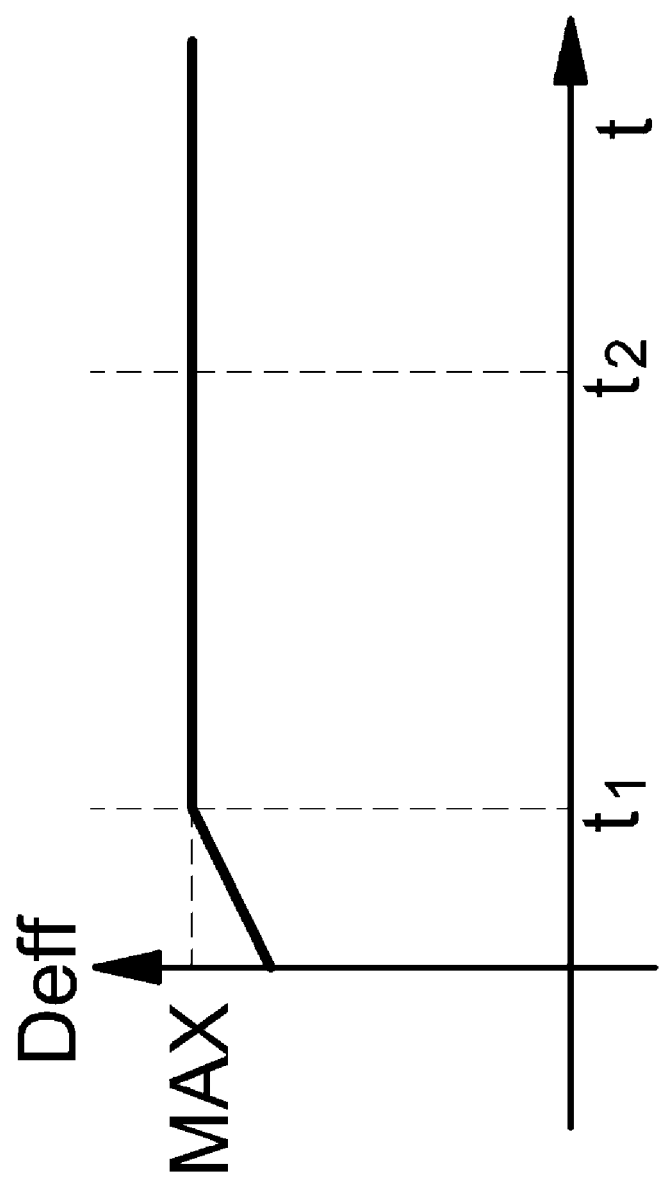
Figure 6C:
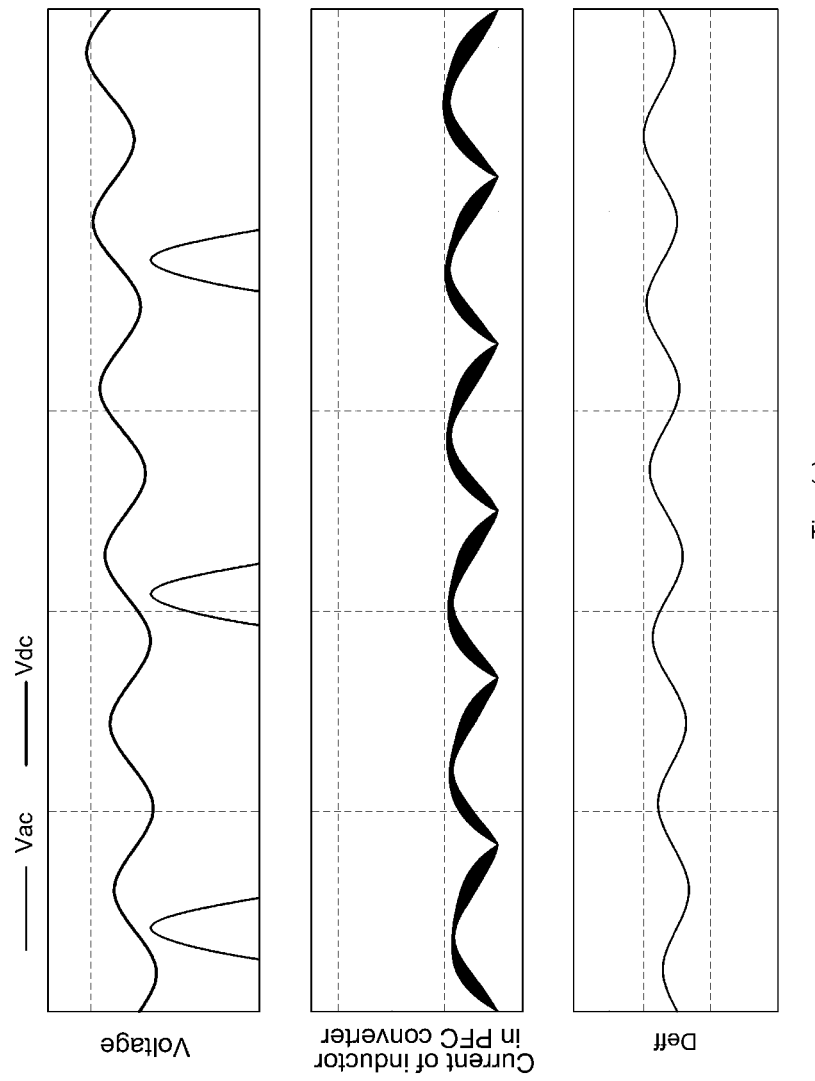

FIGS. 5a-5c illustrate that the unit power factor control of the PFC converter is impossible when the output voltage of the PFC converter is equal to or less than the AC input voltage (Vdc≤Vac). Thus, the unit power factor control of the PFC converter may be possible by maintaining the output voltage of the PFC converter to be greater than the AC input voltage (e.g., the maximum value of the input voltage) (Vdc>Vac) as shown in FIGS. 6a-6c.

In the present invention, after the AC input voltage of the OBC and the battery voltage are sensed, the output voltage of the PFC converter may be variably maintained, in real time, using the battery voltage and the maximum available duty value of the DC-DC converter. In particular, the output voltage of the DC-DC converter may be maintained using the maximum available duty value, thereby maximizing the charging efficiency of the high-voltage battery. Further, the output voltage of the PFC converter may be limited as a value greater than the input voltage to avoid the area in which the unit power factor control of the PFC converter is impossible (e.g., when the output voltage is less than the input voltage, the unit power factor control is impossible). Accordingly, it may be possible to maintain high efficiency and to enable the unit power factor control of the PFC converter.

Figure 8A:
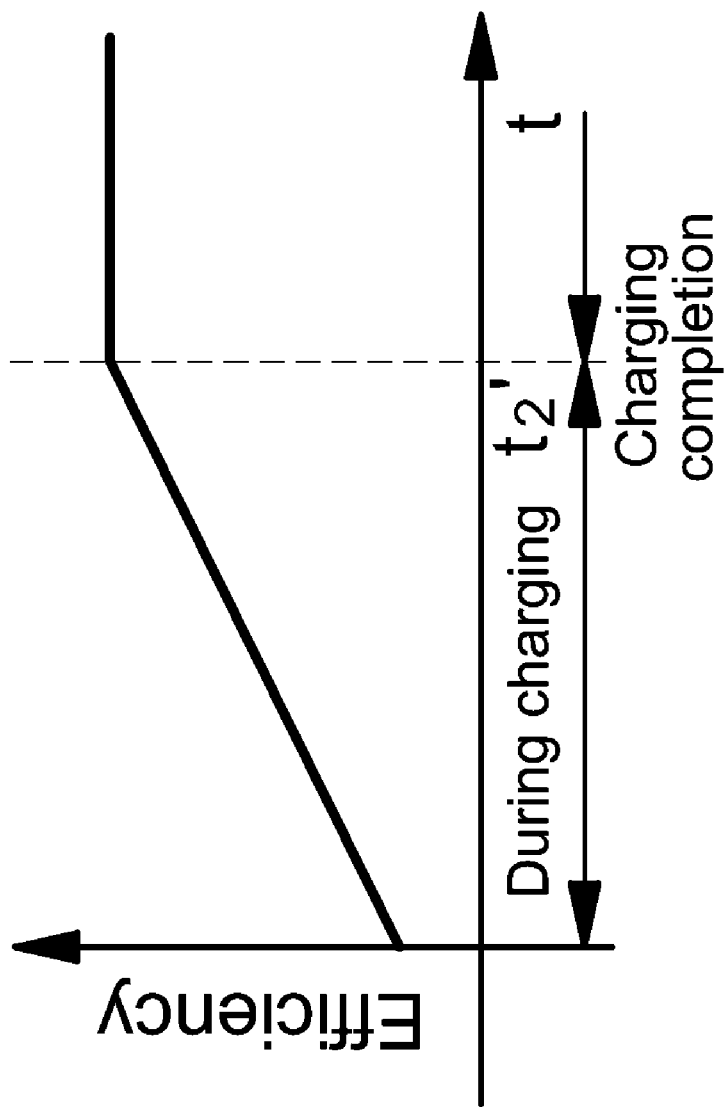
FIGS. 8a-8b are exemplary diagrams illustrating that the enhancement of charging efficiency and the decrease in charging time are achieved in the charging control method according to the exemplary embodiment of the present invention.
Figure 8B:
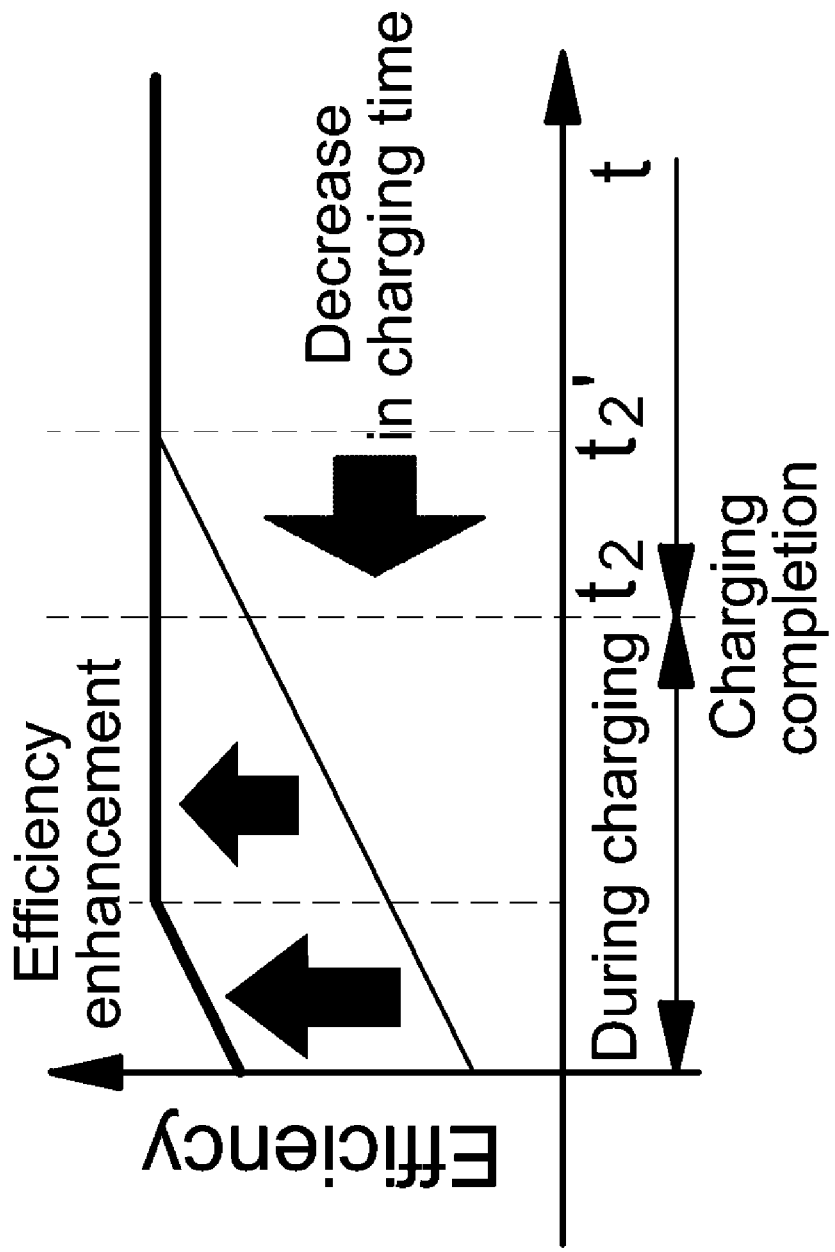

FIGS. 8a-8b is an exemplary diagram illustrating that the enhancement of charging efficiency and the decrease in charging time may be achieved in the charging control method according to the exemplary embodiment of the present invention.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A charging control method for a vehicle with a built-in on board charger (OBC) including a power factor correction (PFC) converter connected to an AC power source to convert an AC input voltage into a DC voltage and compensate for the power factor of the voltage, and a DC-DC converter for converting the DC voltage output from the PFC converter, the charging control method comprising:
sensing, by a voltage detector, a battery voltage during charging;
calculating, by a controller, a target value to maintain an output voltage of the PFC converter from the sensed battery voltage and the maximum available duty value of the DC-DC converter;
maintaining, by the controller, the output voltage of the PFC converter, based on the calculated target value; and
maintaining, by the controller, the output voltage of the DC-DC converter as the maximum available duty while the output voltage of the PFC converter is maintained, based on the calculated target value.

2. The charging control method of claim 1, further comprising:
sensing, by the voltage detector, an AC input voltage during the charging to compare the calculated target value with the sensed AC input voltage,
maintaining, by the controller, the output voltage of the PFC converter based on the target value, when the calculated target value is a value greater than the sensed AC input voltage.

3. The charging control method of claim 2, further comprising:
maintaining, by the controller, the output voltage of the PFC converter as a value greater than the AC voltage, when the calculated target value is equal to or less than the sensed AC input voltage.

4. The charging control method of claim 3, further comprising:
maintaining, by the controller, the output voltage (Vdc) of the PFC converter to become the value obtained by adding a predetermined margin value (α) to the maximum value (Vac_max) of the sensed AC input voltage, when the calculated target value is equal to or less than the sensed AC input voltage.

5. The charging control method of any one of claim 4, further comprising:
calculating, by the controller, the target value from the following equation, using the battery voltage and the maximum available duty value of the DC-DC converter:

$$Vdc\_target = K \times Vbat,$$

wherein Vdc_target represents the target value, K=n/Deff_max, Deff_max represents the maximum available duty value of the DC-DC converter, and n represents the number of coil turns of a transformer in the DC-DC converter.

6. A charging control system for a vehicle with a built-in on board charger (OBC) including a power factor correction (PFC) converter connected to an AC power source to convert an AC input voltage into a DC voltage and compensate for the power factor of the voltage, and a DC-DC converter for converting the DC voltage output from the PFC converter, the charging control system comprising:

a memory configured to store program instructions; and
a processor configured to execute the program instructions, the program instructions when executed configured to:
- calculating, by a controller, a target value to maintain an output voltage of the PFC converter from a sensed battery voltage and the maximum available duty value of the DC-DC converter;
- maintaining, by the controller, the output voltage of the PFC converter, based on the calculated target value; and
- maintain the output voltage of the DC-DC converter as the maximum available duty while the output voltage of the PFC converter is maintained, based on the calculated target value.

7. The charging control system of claim 6, wherein the program instructions when executed are further configured to:
- maintain the output voltage of the PFC converter based on the target value, when the calculated target value is a value greater than a sensed AC input voltage.

8. The charging control system of claim 7, wherein the program instructions when executed are further configured to:
- maintain the output voltage of the PFC converter as a value greater than the AC voltage, when the calculated target value is equal to or less than the sensed AC input voltage.

9. The charging control system of claim 8, wherein the program instructions when executed are further configured to:
- maintain the output voltage (Vdc) of the PFC converter to become the value obtained by adding a predetermined margin value ($\alpha$) to the maximum value (Vac_max) of the sensed AC input voltage, when the calculated target value is equal to or less than the sensed AC input voltage.

10. The charging control system of claim 9, wherein the program instructions when executed are further configured to:
- calculate the target value from the following equation, using the battery voltage and the maximum available duty value of the DC-DC converter:

$$Vdc\_target = K \times Vbat,$$

wherein Vdc_target represents the target value, K=n/Deff_max, Deff_max represents the maximum available duty value of the DC-DC converter, and n represents the number of coil turns of a transformer in the DC-DC converter.

11. A non-transitory computer readable medium containing program instructions executed by a controller, the computer readable medium comprising:
- program instructions that control a voltage detector to sense a battery voltage during charging;
- program instructions that calculate a target value to maintain an output voltage of the PFC converter from the sensed battery voltage and the maximum available duty value of the DC-DC converter;
- program instructions that maintain the output voltage of the PFC converter, based on the calculated target value; and
- program instructions that maintain the output voltage of the DC-DC converter as the maximum available duty while the output voltage of the PFC converter is maintained, based on the calculated target value.

12. The non-transitory computer readable medium of claim 11, further comprising:
- program instructions that maintain the output voltage of the PFC converter based on the target value, when the calculated target value is a value greater than a sensed AC input voltage.

13. The non-transitory computer readable medium of claim 12, further comprising:
- program instructions that maintain the output voltage of the PFC converter as a value greater than the AC voltage, when the calculated target value is equal to or less than the sensed AC input voltage.

14. The non-transitory computer readable medium of claim 13, further comprising:
- program instructions that maintain the output voltage (Vdc) of the PFC converter to become the value obtained by adding a predetermined margin value ($\alpha$) to the maximum value (Vac_max) of the sensed AC input voltage, when the calculated target value is equal to or less than the sensed AC input voltage.

15. The non-transitory computer readable medium of claim 14, further comprising:
- program instructions that calculate the target value from the following equation, using the battery voltage and the maximum available duty value of the DC-DC converter:

$$Vdc\_target = K \times Vbat,$$

wherein Vdc_target represents the target value, K=n/Deff_max, Deff_max represents the maximum available duty value of the DC-DC converter, and n represents the number of coil turns of a transformer in the DC-DC converter.

* * * * *